United States Patent
Hecht et al.

(10) Patent No.: US 12,051,103 B1
(45) Date of Patent: Jul. 30, 2024

(54) CUSTOMER VERIFICATION AND ACCOUNT CREATION SYSTEMS AND METHODS

(71) Applicant: Wells Fargo Bank, N.A., San Francisco, CA (US)

(72) Inventors: Alan W. Hecht, Chanhassen, MN (US); Margaret Mangot, San Francisco, CA (US); Kelli Todd, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/409,321

(22) Filed: Aug. 23, 2021

Related U.S. Application Data

(63) Continuation of application No. 15/964,524, filed on Apr. 27, 2018, now Pat. No. 11,100,572.

(60) Provisional application No. 62/491,912, filed on Apr. 28, 2017.

(51) Int. Cl.
*G06Q 40/02* (2023.01)
*G06V 30/413* (2022.01)
*G06V 30/418* (2022.01)
*H04L 67/306* (2022.01)

(52) U.S. Cl.
CPC ........... *G06Q 40/02* (2013.01); *G06V 30/413* (2022.01); *G06V 30/418* (2022.01); *H04L 67/306* (2013.01)

(58) Field of Classification Search
CPC .... G06Q 40/20; G06V 30/418; G06V 30/413; H04L 67/306
USPC .......................................................... 705/35
See application file for complete search history.

(56) References Cited

U.S. PATENT DOCUMENTS

| | | |
|---|---|---|
| 5,602,933 A | 2/1997 | Blackwell et al. |
| 5,668,874 A | 9/1997 | Kristol et al. |
| 5,799,092 A | 8/1998 | Kristol et al. |
| 7,738,857 B2 | 6/2010 | Engstrom et al. |
| 8,355,527 B2 | 1/2013 | Bladel et al. |
| 8,355,528 B2 | 1/2013 | Bladel et al. |
| 8,548,914 B2 | 10/2013 | Sinton et al. |
| 8,577,810 B1 | 11/2013 | Dalit et al. |
| 8,594,632 B1 | 11/2013 | Azizi et al. |
| 8,640,197 B2 * | 1/2014 | Heffez .................... H04L 63/18 705/37 |

(Continued)

OTHER PUBLICATIONS

Joseph Henkel; Justin Zhan, "Remote Deposit Capture in the Consumer's Hands", 2010, IEEE (Year: 2010).

*Primary Examiner* — David P Sharvin
*Assistant Examiner* — Gregory M James
(74) *Attorney, Agent, or Firm* — Foley & Lardner LLP

(57) ABSTRACT

A computing system includes an account management circuit configured to generate, responsive to receiving an input from the user device regarding establishment of a new account, an interface overlay on a user interface. The interface overlay includes an outline for an identification item. The circuit is also configured to determine that the identification item is contained within the outline of the interface overlay. The circuit is also configured to capture, automatically based on the determination that the identification item is contained within the outline, a first image of the identification item of the user. The circuit is also configured to verify an identity of the user based on a comparison of the first image with a second image of the user. The circuit is also configured to create, responsive to the verification of the identity of the user, the new account for the user.

19 Claims, 8 Drawing Sheets

(56) References Cited

U.S. PATENT DOCUMENTS

| | | |
|---|---|---|
| 8,864,022 B2 | 10/2014 | Hernandez |
| 9,100,826 B2 | 8/2015 | Weiss |
| 9,202,105 B1* | 12/2015 | Wang ............... H04N 21/44008 |
| 9,269,015 B2 | 2/2016 | Boncyk et al. |
| 9,300,830 B2 | 3/2016 | Yamamoto |
| 9,495,586 B1 | 11/2016 | Hagen et al. |
| 9,530,132 B2 | 12/2016 | Cox |
| 9,563,643 B2 | 2/2017 | Panneer et al. |
| 9,589,205 B2 | 3/2017 | Joshi et al. |
| 9,619,697 B2 | 4/2017 | Pabbichetty |
| 9,619,803 B2 | 4/2017 | Chandrasekaran et al. |
| 9,621,548 B2 | 4/2017 | Bud |
| 9,633,187 B1 | 4/2017 | Kozko |
| 11,100,572 B1* | 8/2021 | Hecht .................. H04W 12/77 |
| 2004/0019564 A1 | 1/2004 | Goldthwaite et al. |
| 2004/0124966 A1 | 7/2004 | Forrest |
| 2005/0033994 A1 | 2/2005 | Suzuki |
| 2007/0105528 A1 | 5/2007 | Haas et al. |
| 2008/0033877 A1* | 2/2008 | Blair ................ G06Q 20/40145 705/44 |
| 2009/0260064 A1 | 10/2009 | McDowell et al. |
| 2011/0276484 A1 | 11/2011 | Pearson et al. |
| 2012/0278155 A1 | 11/2012 | Faith |
| 2012/0284194 A1* | 11/2012 | Liu ........................... G07F 7/08 705/66 |
| 2012/0287217 A1* | 11/2012 | Prentice ............ H04M 1/27475 348/14.01 |
| 2014/0258120 A1* | 9/2014 | Specogna ............ G06Q 20/409 705/44 |
| 2015/0095352 A1* | 4/2015 | Lacey ................ G06F 21/6218 707/752 |
| 2015/0161723 A1* | 6/2015 | Rose .................. G06Q 30/0609 705/38 |
| 2015/0281231 A1 | 10/2015 | Ganesan |
| 2016/0005038 A1 | 1/2016 | Kamal et al. |
| 2016/0012217 A1 | 1/2016 | Wolf et al. |
| 2016/0063235 A1 | 3/2016 | Tussy |
| 2016/0110531 A1 | 4/2016 | Ohbitsu |
| 2016/0127360 A1 | 5/2016 | Ball et al. |
| 2016/0210612 A1 | 7/2016 | Tervo et al. |
| 2016/0227109 A1 | 8/2016 | Mattes |
| 2016/0239657 A1 | 8/2016 | Loughlin-McHugh et al. |
| 2016/0275518 A1 | 9/2016 | Bowles et al. |
| 2016/0371540 A1 | 12/2016 | Pabbichetty |
| 2016/0379042 A1 | 12/2016 | Bourlai et al. |
| 2016/0381013 A1 | 12/2016 | Buscemi |
| 2017/0004577 A1* | 1/2017 | Cunningham ........ G06Q 20/10 |
| 2017/0032114 A1 | 2/2017 | Turgeman |
| 2017/0093850 A1 | 3/2017 | Kukreja |
| 2017/0286765 A1* | 10/2017 | Rodriguez ........... G06V 30/416 |
| 2018/0211243 A1* | 7/2018 | Ekpenyong ............ G06Q 20/18 |

* cited by examiner

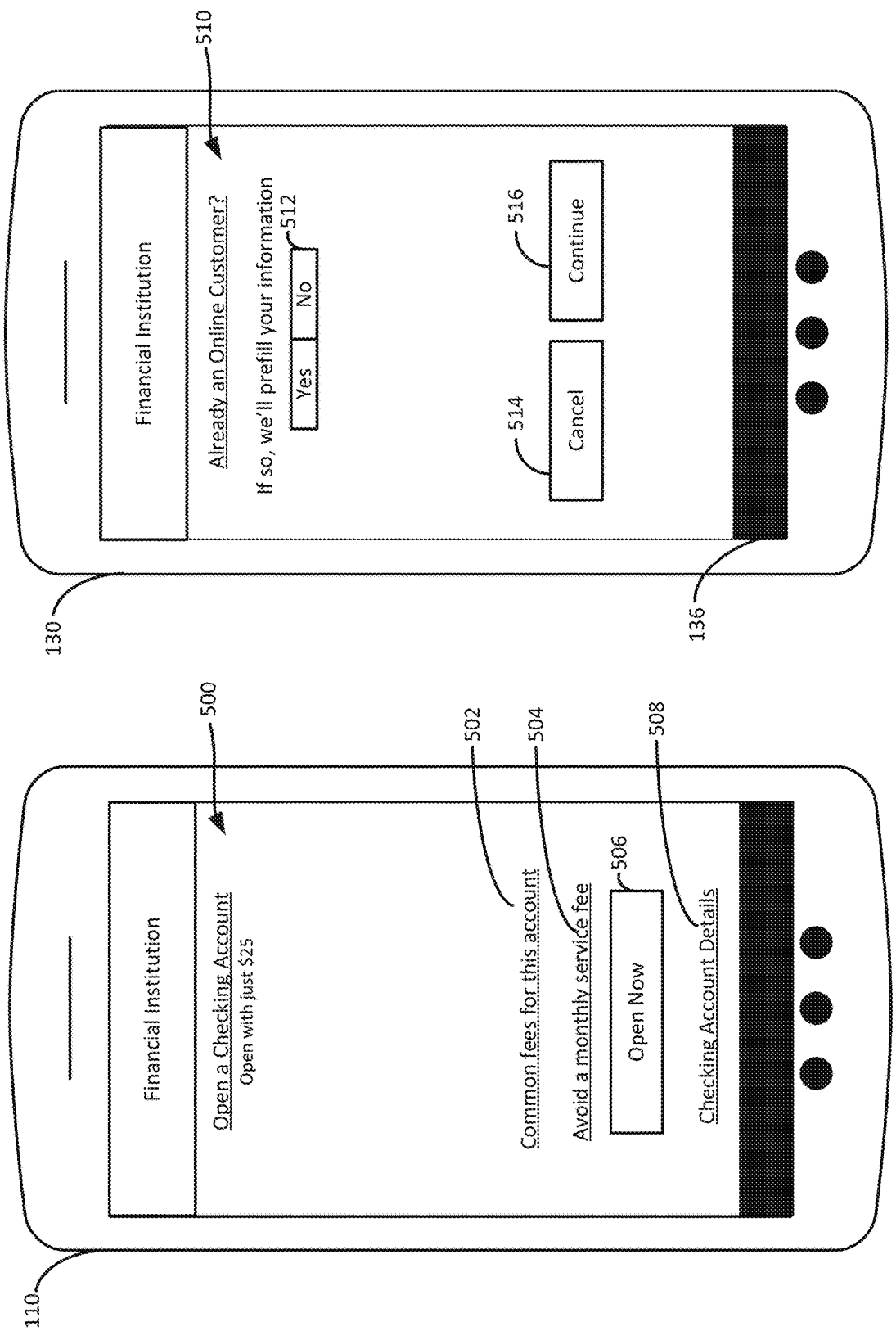

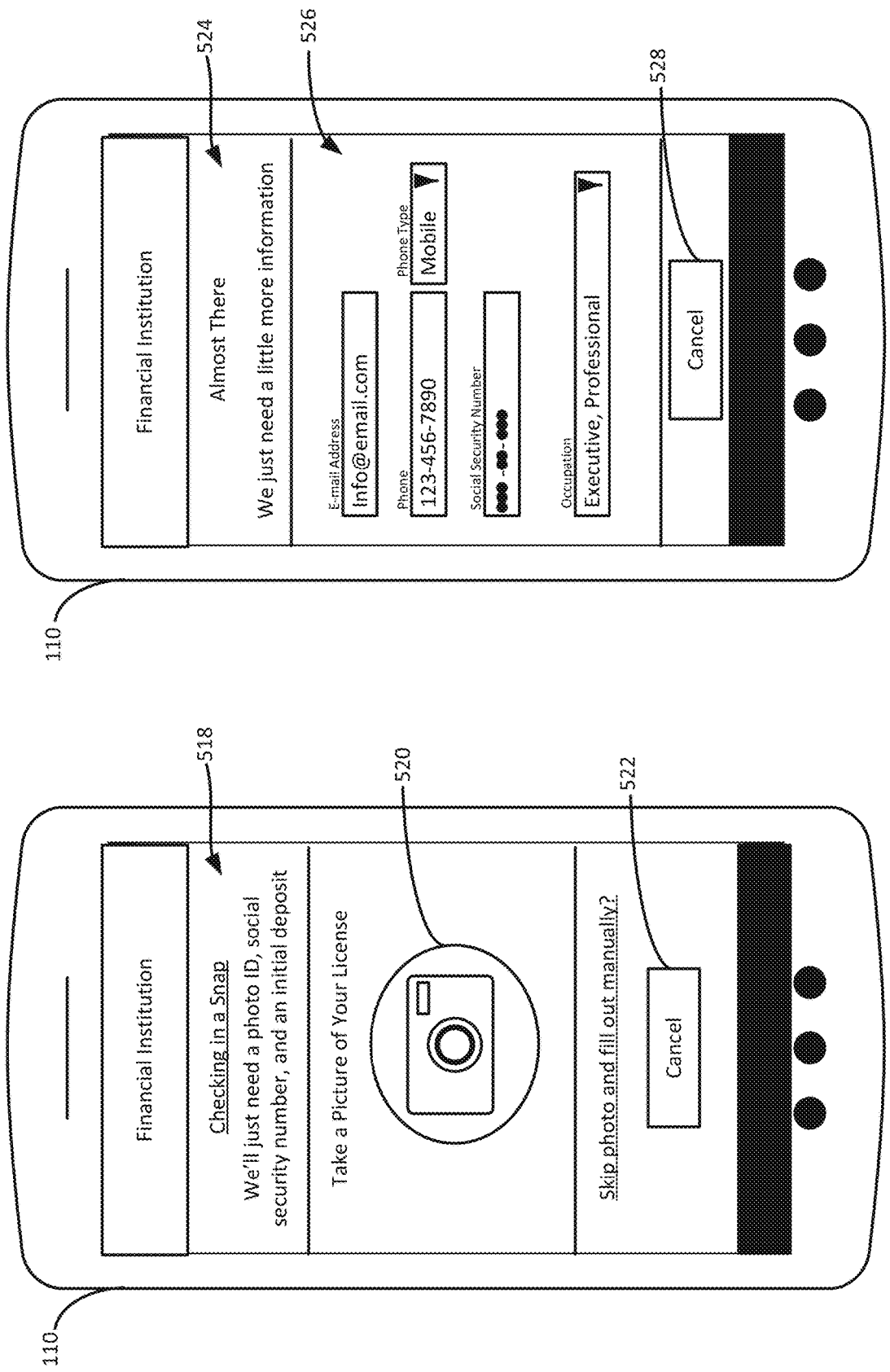

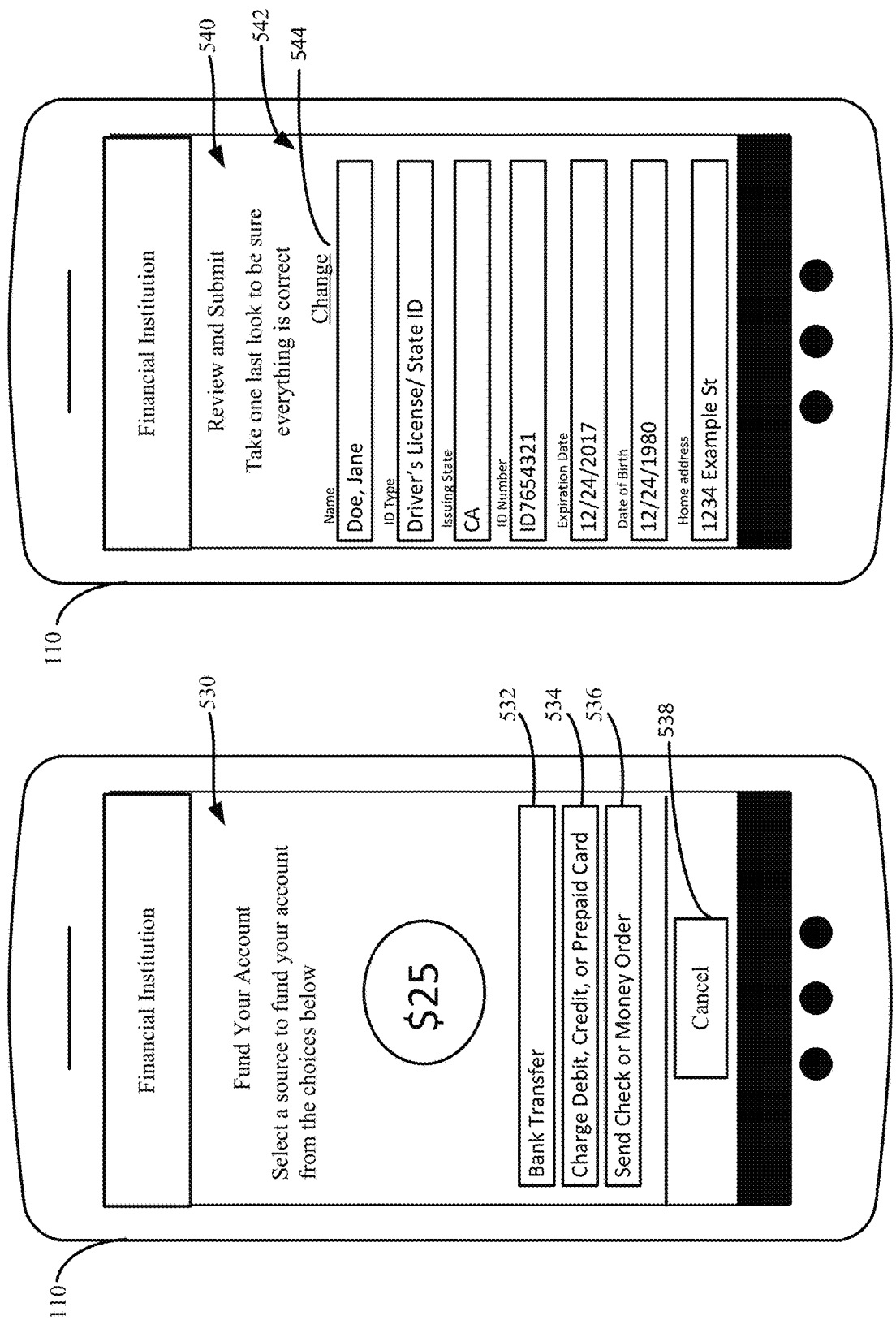

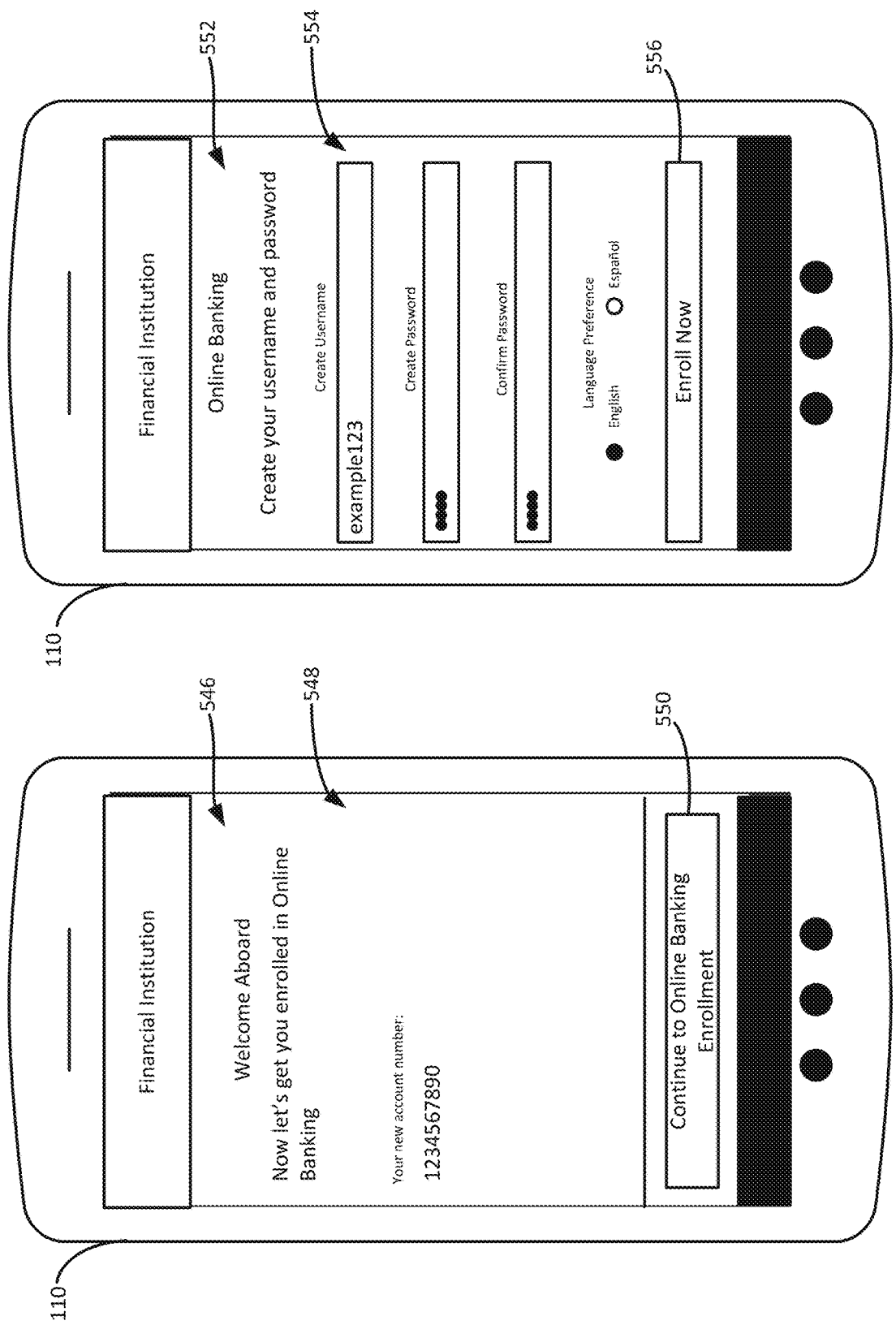

CUSTOMER VERIFICATION AND ACCOUNT CREATION SYSTEMS AND METHODS

CROSS-REFERENCE TO RELATED PATENT APPLICATIONS

This application is a continuation of U.S. patent application Ser. No. 15/964,524 filed Apr. 27, 2018, which claims the benefit of and priority to U.S. Provisional Patent Application No. 62/491,912 filed Apr. 28, 2017, each of which are incorporated herein by reference in their entirety and for all purposes.

BACKGROUND

Opening up a financial account can be a burdensome process for a customer. For example, in a conventional account opening process, a customer must remember and input identifying information into a form. Not only can this be burdensome for the customer, but it can also cause problems for the financial institution. For example, if the customer makes an error in entering their information, the financial institution may be unable to verify the customer's identity and opening a new account may then be delayed. Thus, it would be beneficial to provide an account opening process that minimizes manually-input information and streamlines verification of the customer's identity.

SUMMARY

One embodiment relates to a computing system. The system includes a network interface configured to communicate data over a network with a user device. The user device is a mobile device. The system also includes an accounts database configured to store information regarding a plurality of customer accounts associated with a plurality of customers of the financial institution. The system also includes an account management circuit communicably coupled to the network interface and the accounts database. The account management circuit is configured to generate, responsive to receiving an input from the user device regarding establishment of a new account, an interface overlay on a user interface. The interface overlay includes an outline for an identification item. The account management circuit is also configured to determine that the identification item is contained within the outline of the interface overlay. The account management circuit is also configured to capture, automatically based on the determination that the identification item is contained within the outline, a first image of the identification item of the user. The account management circuit is also configured to verify an identity of the user based on a comparison of the first image with a second image of the user. The account management circuit is also configured to create, responsive to the verification of the identity of the user, the new account for the user.

Another embodiment relates to a computer-implemented method. The method includes receiving, by a computing system, an input from a customer device associated with a customer to establish a new account at a financial institution. The customer device is a mobile device. The method also includes generating, by the computing system, responsive to receiving the input from the customer device, an interface overlay on a webpage displayed on the customer device. The interface overlay includes an outline for an identification item. The method also includes determining, by the computing system, that the identification item is contained within the outline of the interface overlay. The method also includes capturing automatically, by the computing system based on the determination that the identification item is contained within the outline, an image of the identification item. The method also includes verifying, by the computing system, an identity of the customer based on comparing the image of the identification item with an identity verification image. The method also includes creating, responsive to verifying the identity of the customer, by the computing system, the new account for the customer.

Another embodiment relates to a non-transitory computer readable media having computer-executable instructions embodied therein that, when executed by an account management circuit of a computing system, causes the computing system to perform operations to generate a new account for a customer. The operations include receiving an input from a customer device associated with the customer to establish the new account. The customer device is a mobile device. The operations also include generating an interface overlay on a webpage displayed on the customer device. The interface overlay includes an outline for an identification item. The operations also include determining that the identification item is contained within the outline of the interface overlay. The operations also include capturing automatically, based on the determination that the identification item is contained within the outline, an image of the identification item. The operations also include verifying an identity of the customer based on comparing the image of the identification item with an identity verification image. The operations also include creating, responsive to verifying the identity of the customer, the new account for the customer.

BRIEF DESCRIPTION OF THE DRAWINGS

FIGS. 5A-5H are example registration interfaces displayed on a customer device during an account initiation process, according to an example embodiment.

DETAILED DESCRIPTION

Figure 1:
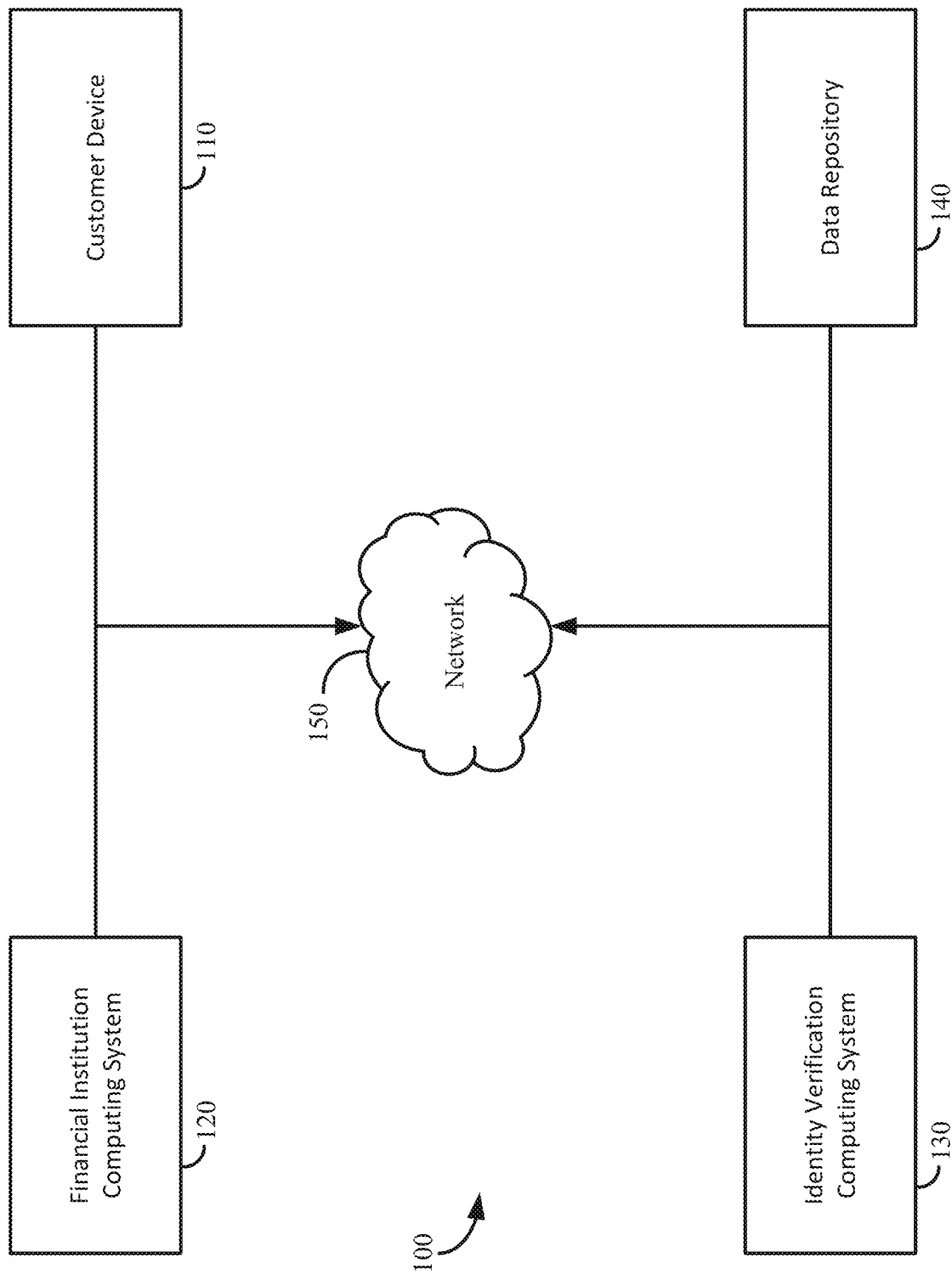
FIG. 1 is a block diagram of an account creation system, according to an example embodiment.

Before turning to the figures, which illustrate example embodiments, it should be understood that this application is not limited to the details or methodology set forth in the following description or illustrated in the figures. It should also be understood that the phraseology and terminology employed herein is for the purpose of description only and should not be regarded as limiting. For example, the embodiments of systems and methods discussed herein may be relevant to any of a variety of circumstances where verifying the identity of a customer may be useful.

Referring generally to the figures, systems and methods for verifying the identity of a customer during an account creation process are shown according to example embodiments. A customer, via an associated customer device, may provide an input to a financial institution computing system associated with a financial institution to open up an account at the financial institution. In response, the financial institution computing system guides the customer through a streamlined account registration process. For example, the financial institution computing system may transmit a prompt to the customer device that instructs the customer to capture an image of a piece of identification (e.g., a driver's license or another government-issued identification) and an additional image of the customer using the customer device. Upon the customer capturing an image of the piece of identification and the additional image, the customer device transmits the images to the financial institution computing system, which verifies the authenticity of the identification and verifies the customer by comparing the image of the identification to the additional image. The financial institution computing system may also extract various forms of customer information from the captured image, request any additional necessary information from the customer to create the account, and prompt the customer to fund the new account. Thus, the systems and methods disclosed herein efficiently and reliably establish a new account for the customer The embodiments and implementations of the systems and methods disclosed herein improve current account activation systems by enhancing identity verification processes. By verifying the identity of the customer (e.g., through comparing the image of the customer to the image of the identification) as well as the authenticity of the customer's piece of identification nearly simultaneously, the systems and methods disclosed herein reduce the amount of time it takes to reliably open a customer account and more efficiently enables a new customer to open a new account without visiting a branch location of the financial institution in person. Furthermore, by extracting customer information from the image of the piece of identification, these efficiency benefits are further enhanced.

The embodiments of the systems and methods discussed herein may be relevant to any of a variety of circumstances where verifying the identity of a customer may be useful. For example, in one embodiment, the identity verification processes disclosed herein may be used in the context of verifying the identity of an employee to an employer. As a result, the customer does not need to provide physical copies of identification to the employer, and the security of physical copies of the customer's identification is ensured.

Referring now to FIG. 1, a block diagram of an identity verification system 100 is shown according to an example embodiment. The identity verification system 100 includes a customer device 110 associated with a customer. The customer may be an individual or any other entity capable of opening up an account at a financial institution. The identity verification system 100 further includes a financial institution computing system 120 associated with the financial institution, an identity verification computing system 130 that may be associated with a third party service provider, and a data repository 140 associated with any entity that maintains information regarding a plurality of customers or potential customers of the financial institution. Various components of the identity verification system 100 may be configured to communicate with one another over a network 150. The network 150 is a data exchange medium, which may include wireless networks (e.g., cellular networks, Bluetooth®, WiFi, Zigbee®, etc.), wired networks (e.g., Ethernet, DSL, cable, fiber-based, etc.), or a combination thereof. In some embodiments, the network 150 includes the internet.

The customer device 110 is a computing device associated with the customer. The customer device 110 includes one or more processors and non-transitory storage mediums housing one or more logics configured to enable the customer device 110 to exchange data over the network 150, execute software applications, access websites, generate graphical user interfaces, and perform similar operations. Examples of the customer device 110 include a personal computer such as a desktop or laptop computer, smartphones, tablets, or wearable computing devices such as smartwatches and the like.

In some embodiments, the customer device 110 is configured to aid the customer in establishing an account at the financial institution via the methods described herein. In this regard, the customer device 110 may include software or executable instructions structured to cause the customer device 110 to transmit and receive various communications to and from the financial institution computing system 120. For example, via the customer device 110, the customer may provide an input to the financial institution computing system 120 to establish an account at the financial institution and, in response, receive additional executable instructions from the financial institution computing system 120. Such executable instructions may cause the customer device 110 to perform various operations to assist the customer in an account creation process described herein. For example, in one embodiment the executable instructions received from the financial institution computing system 120 cause a camera of the customer device 110 to capture images of the customer and a piece of customer identification. The instructions also cause the customer device 110 to transmit these captured images to the financial institution computing system 120 over the network 150. As described herein, these communications may be part of a streamlined customer account registration and verification process.

The financial institution computing system 120 is a computing system at a financial institution that is capable of establishing and maintaining customer accounts. The financial institution may include commercial or private banks, credit unions, investment brokerages, or the like. In response to receiving an input from the customer to establish an account, the financial institution computing system 120 may be configured to initiate an account creation sequence specifically for the customer. For example, the financial institution computing system 120 may transit instructions, program logic and values to the customer device 110 over the network 150 that cause various registration interfaces to be presented to the customer. Such registration interfaces may request the customer to capture an image of identification (e.g., a driver's license or other government-issued identification), capture a customer verification image or video (e.g., of the customer's face), and input various forms of information (e.g., required information to open up a checking account at the financial institution).

In some embodiments, the financial institution computing system 120 is configured to perform various operations on information provided by the customer to verify the customer's identity. For example, upon receiving the captured image of the customer's identification, the financial institution computing system 120 may verify the authenticity of the identification by comparing the captured image to images of verified pieces of identification, for example, by comparing the captured image to images stored in a third party database (e.g., a government organization database such as one maintained by a state's Department of Motorized Vehicles or a database maintained by the American Association of Motor Vehicle Administrators). Additionally, the financial institution computing system 120 may extract information from the captured image and use the extracted information to establish a new customer account and to further verify the authenticity of the identification. In this regard, the financial institution computing system 120 may utilize the extracted information to formulate an information request for transmittal to a data repository 140 over the network 150, which may be associated with a governmental entity that issued the customer's identification. In response to the information request, the data repository 140 may retrieve information regarding the customer and transmit the information to the financial institution computing system 120. The financial institution computing system 120 may compare the information received from the data repository 140 to the extracted information to further verify the authenticity of the customer's identification.

In some embodiments, the financial institution computing system 120 may communicate with various other entities to verify the customer's identity prior to establishing a new account. For example, the financial institution computing system 120 may use information regarding the customer device 110 (e.g., obtained based on the network protocol through which communication with the customer device 110 is established over the network 150) and information input by the customer into the registration interfaces discussed herein to formulate a verification request for transmittal to identity verification computing system 130 to confirm the customer's identity.

The identity verification computing system 130 is a computing system associated with a third party that is configured to aid the financial institution in verifying the identity of the customer. The third party is an entity capable of establishing an agreement with the financial institution to aid the financial institution in establishing accounts for various customers. In one embodiment, the third party is an external service provider (e.g. Payfone®) having relationships with various other service providers that provide services to potential customers of the financial institution. In an example, the external service provider is an identity verification service having arrangements with various network service providers that enable various potential customers to access a network (e.g., a mobile communications network) via various devices similar to the customer device 110 (e.g., smart phones). Under such arrangements, the third party may maintain a database describing an aspect of the potential customers' relationship to the network service provider. For example, the identity verification computing system 130 may maintain a database including a plurality of customer identification tokens. The tokens may include sequences of symbols that are generated based on a customer's identity as well as her relationship to a network service provider. For example, the customer identification token may be generated based on a customer's address and phone number. Under such an arrangement, any time a customer changes a phone number, for example, the network service provider may notify the third party, which may update the customer's identification token based on the customer's updated phone number. As such, the identification tokens may be used by the financial institution to further verify the identity of various prospective customers.

In some embodiments, the identity verification computing system 130 is configured to respond to verification requests received from the financial institution computing system 120. For example, verification requests received from the financial institution computing system 120 may contain information regarding the customer device 110 (e.g., a customer phone number, a public IP address, a private IP address, a SIM card identification number, etc.) and other information regarding the customer (e.g., a customer name, address, account number, etc.). In response to receiving such a verification request, the identity verification computing system 130 may retrieve a customer identification token stored in association with the customer, and compare the information regarding the customer contained in the token to the information contained in the verification request (e.g., compare a customer phone number contained in the identification token to the customer phone number received in the verification request). If a match is found, the identity verification computing system 130 transmits a verification response to the financial institution computing system 120, thus providing further assurance of the identity of the customer to the financial institution computing system 120 prior to creating a new account for the customer.

The data repository 140 is configured to store information regarding potential customers of the financial institution and communicate the stored information to various requestors over the network 150. In some embodiments, the identity verification system 100 contains a plurality of data repositories 140. In some embodiments, the data repositories 140 are associated with a plurality of entities that issue various forms of customer identification (e.g., passports, driver's licenses, etc.) such as governmental entities. In such embodiments, the data repository 140 may include a computing system configured to verify customer information contained in various requests received from the financial institution computing system 120 over the network 150.

In some embodiments, the data repositories 140 are be associated with other third parties having other types of relationships with various customers. For example, one data repository 140 may be associated with a network service provider that enables customers to access a network via devices similar to the customer device 110 discussed above. In such arrangements, the data repository 140 may be configured to communicate with the identity verification computing system 130 over the network 150 (e.g., to enable the identity verification computing system 130 to update the customer tokens discussed above).

Figure 2:
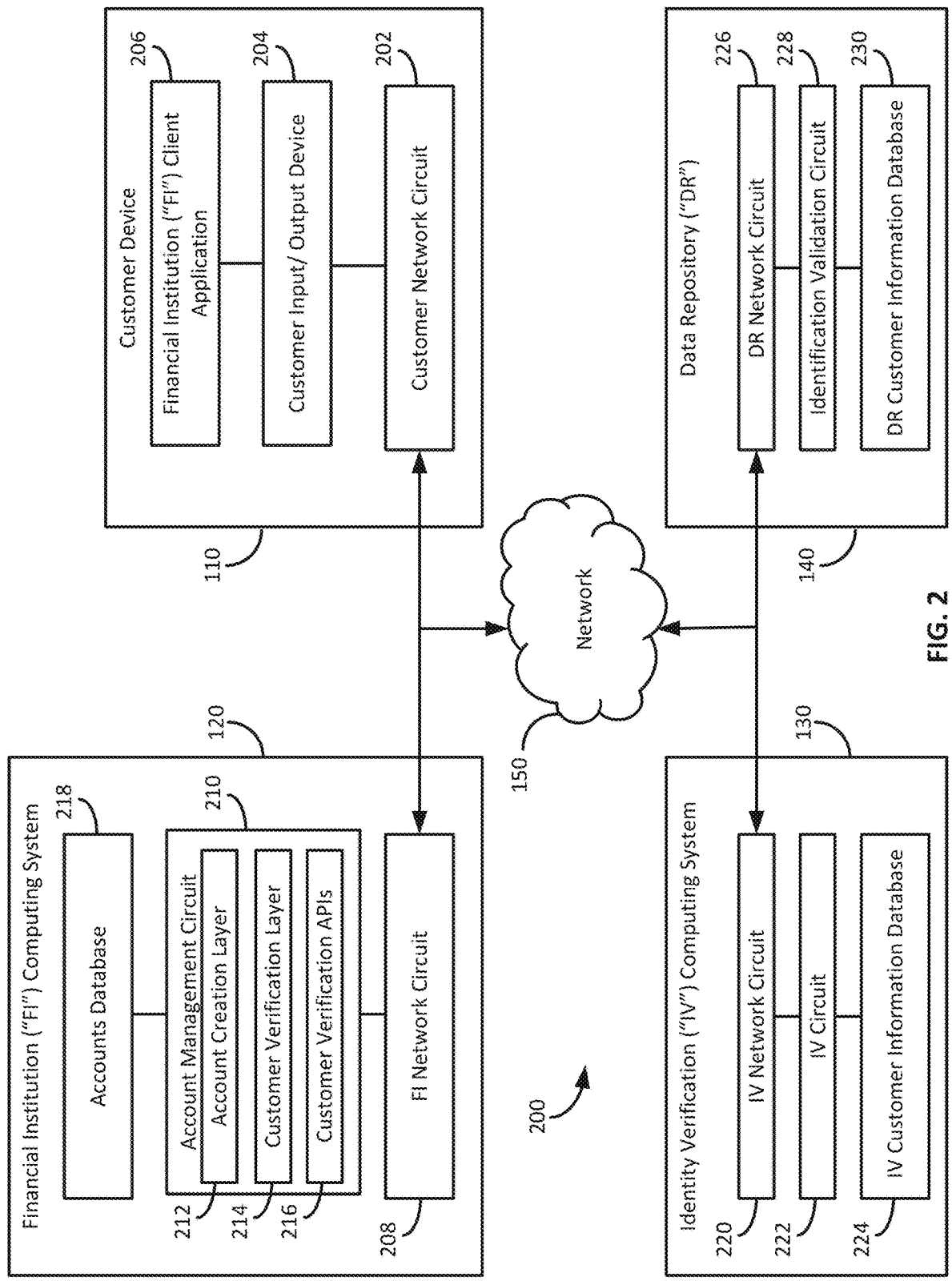
FIG. 2 is a block diagram illustrating an example embodiment of the account creation system shown in FIG. 1.

Referring now to FIG. 2, an identity verification system 200 is shown as a more detailed embodiment of the system 100 discussed in relation to FIG. 1. The identity verification system 200 includes example embodiments of the customer device 110, the financial institution computing system 120, the identity verification computing system 130, the data repository 140, and the network 150 of FIG. 1.

In the system 200, the customer device 110 includes a customer network circuit 202 enabling the customer device 110 to exchange data over the network 150, a customer input output ("I/O") device 204, and a financial institution client application 206. An input aspect of the customer I/O device 204 allows an individual operating the customer device 110 to provide information to the customer device 110, and may include, for example, a mechanical keyboard, a touchscreen, a microphone, a camera, a 3D image scanner, a fingerprint scanner, any user input device engageable to the customer device 110 via a USB, serial cable, Ethernet cable, and so on. An output aspect of the customer I/O device 204 allows an individual associated with the customer device 110 or in proximity to customer device 110 to receive information from the customer device 110, and may include, for example, a digital display, a speaker, illuminating icons, LEDs, and so on. Further, the customer I/O device 204 may be configured to include assemblies that serve both input and output functions, allowing the financial institution computing system 120 to exchange information with the customer device 110. Such assemblies include, for example, radio frequency transceivers (e.g., RF or NFC-based transceivers)

and other short-range wireless transceivers (e.g., Bluetooth®, laser-based data transmitters, etc.).

The financial institution client application 206 is structured to provide displays to the customer device 110 that enable the customer to communicate with the financial institution computing system 120 over the network 150. Accordingly, the financial institution client application 206 is communicably coupled to the customer network circuit 202. The displays provided by the financial institution client application 206 may enable the customer to view information regarding various products (e.g., accounts, advising, financial services, and other financial products), and register for an account at the financial institution. Further, if the customer has established an account with the financial institution, the displays may enable the customer to manage the account. As such, the displays provided by the financial institution client application 206 may be indicative of current account balances, pending transactions, profile information (e.g., contact information), and the like.

In some embodiments, the financial institution client application 206 is a separate software application implemented on the customer device 110. The financial institution client application 206 may be downloaded by the customer device 110 prior to its usage, hard coded into the memory of the customer device 110, or be a web-based interface application such that the customer device 110 may provide a web browser to the application, which may be executed remotely from the customer device 110 or downloaded by the customer device 110 just prior to its usage. In some embodiments, parts of the financial institution client application 206 may be stored in the memory of the customer device 110 and others may be web-based. In such instances, the customer may have to log onto or access the web-based interface before usage of the applications. Further, and in this regard, the financial institution client application 206 may be supported by a separate computing system including one or more servers, processors, network interface circuits, etc. that transmit applications for use to the customer device 110. In certain embodiments, the financial institution client application 206 includes an API and/or a software development kit (SDK) that facilitates the integration of other applications.

In some embodiments, the financial institution client application 206 is configured to aid the customer in establishing an account at the financial institution. In such embodiments, the financial institution client application 206 may be at least partly web-based. For example, while the customer device 110 is executing a web browser, the customer may access a website run by the financial institution computing system 120 (e.g., by typing in a domain name associated with the website, clicking a hyperlink to the domain name, etc.) through any established communications protocol, and provide an input to create an account at the financial institution. In response to such an input, the financial institution computing system 120 may transmit various datasets, instructions, and program logics to the customer device 110 over the network 150. The datasets may include various parameters to render various account registration interfaces to the customer via the customer I/O device 204. Such registration interfaces may enable the customer to provide various inputs to the program logics to provide the financial institution computing system 120 with information to verify the customer's identity. Example registration interfaces will be discussed below in relation to FIGS. 5A-5H.

The financial institution computing system 120 is a computing system associated with the financial institution. In the example embodiment shown, the financial institution computing system 120 includes a financial institution network circuit 208 enabling the financial institution computing system 120 to exchange data over the network 150, an account management circuit 210, and an accounts database 218. The accounts database 218 is structured to retrievably store information pertaining to accounts held by a number of customers at the financial institution. The accounts database 218 may include non-transient data storage mediums (e.g., local disc or flash-based hard drives, local network servers) or remote data storage facilities (e.g., cloud servers). The accounts database 218 may include personal customer information (e.g., names, addresses, phone numbers), identification information (e.g., driver's license numbers, standard biometric data), and customer financial information (e.g., token information, account numbers, account balances, available credit, credit history, transaction histories).

The account management circuit 210 is configured to manage the financial accounts of various customers, including maintaining and handling transaction processing for various customer accounts. In some embodiments, the financial institution client application 206 is provided by the account management circuit 210. In this regard, the account management circuit 210 is configured to provide interfaces, displays, and associated content to enable customers to create and manage accounts at the financial institution associated with the financial institution computing system 130.

In the example shown, the account management circuit 210 includes an account creation layer 212, a customer verification layer 214, and customer verification APIs 216. The account creation layer 212 is configured to aid the customer through at least one of several account initiation processes implemented by the financial institution computing system 120 to create a new account at the financial institution. The account creation layer 212 may implement different account initiation processes depending on the type of account that the customer seeks to open. Different program logics, instructions, and display datasets may be transmitted to the customer device 110 depending on whether the customer seeks to open a checking account or a credit account, for example. In some embodiments, the account creation layer 212 may implement one of two different account initiation sequences for a new customer checking account. The initiation sequences may differ from one another in the manner in which they fulfill various legal obligations imposed on the financial institution (e.g., Know Your Customer and/or Customer Identification Program laws) prior to creating a new customer checking account.

The first account initiation sequence may include a conditional account approval step and a final account approval step. In the conditional account approval step, information is gathered from the customer via the transmittal of various registration interfaces to the customer device 110 prompting the customer to, for example, take an image of a piece of identification and provide various other forms of necessary information. Using the information received from the customer, the account management circuit 210 conditionally approves the new customer account (e.g., responsive to determining that the customer is not on any lists of known bad actors) subject to an additional identity verification step taking more time (e.g., another hour, day, days, etc.) to complete.

The second account initiation sequence may be more streamlined than the first account initiation sequence. For example, the second account initiation sequence may verify the customer's identity on the same day (e.g., within minutes) of the customer initially indicating a preference to open up an account. In this regard, the registration interfaces, instructions, and program logic transmitted to the customer device 110 in the second initiation sequence may request additional information from the customer. For example, in addition to requesting an image of the customer's identification, the registration interfaces may prompt the customer to capture an image or video of the customer's face while the customer performs a predetermined action (e.g., makes a certain gesture, poses in a certain manner, blinks, etc.). According the methods described herein, such an image may be used to quickly verify the identity of the customer, enabling prompt access to the customer's new account.

In some embodiments, certain predetermined criteria must be applicable to the customer in order for the second initiation sequence to be implemented. For example, in one embodiment, the customer's location must meet predetermined criteria (e.g., the customer must be located in one of a predetermined set of states) and the customer device 110 must be of a particular type (e.g., a smartphone of a specified operating system). Accordingly, the account management circuit 210, via the account creation layer 212, may initially assess information contained in an initial account creation input received from the customer device 110 to determine if the predetermined criteria are applicable to the customer.

For example, the customer may access a webpage associated with the financial institution via a web browser on the customer device 110 and provide an input to open up a checking account (e.g., by hitting an "account open" button on the webpage). In response to the customer providing such an input, the web-browser generates an information packet indicating the customer's preference and also including the customer's location information (e.g., obtained via a GPS device on the customer device 110) and transmit the packet to the financial institution computing system 120 over the network 150 via any established communications protocol (e.g., HTTP). As such, the information packet may include an IP address (e.g., a temporary IP address assigned to the customer device 110 by a network service provider). Upon receipt of the information packet, the account management circuit 210 determines if the customer location information meets predetermined criteria and, based on the IP address, determines if the customer device 110 is capable of performing the second account initiation sequence. If not, the account management circuit 210 may transmit a first package of registration interface datasets, instructions, and program logic to the customer device 110 to perform the first account initiation process. If so, the account management circuit 210 transmits a second package of registration interface datasets, instructions, and program logic to the customer device 110 to perform the second account initiation process.

In various embodiments, during the second, streamlined account creation process, the account management circuit 210 performs various operations on information received from the customer via the registration interfaces to verify the identity of the customer. In this regard, account management circuit 210 is shown to further include a customer verification layer 214 and customer verification application programming interfaces (APIs) 216. The customer verification layer 214 includes program logic enabling the account management circuit 210 to take various actions to verify the customer's identity. One such action may include verifying the authenticity of the piece of identification imaged by the customer. To do this, the customer verification layer 214 may include or otherwise provide access to (e.g., via querying an external database) various identification templates. Such identification templates may include various signatures (e.g., marks, logos, coloring schemes, etc.) of various forms of identification issued by a number of different types of entities (e.g., governmental entities). Accordingly, based on an image of the customer's identification captured by the customer, the account management circuit 210 identifies the entity that issued the customer's identification, retrieves a template associated with the identified entity, and compares the captured image to the template to determine if the signatures are present in the captured image to verify the authenticity of the customer's identification.

Additional steps may be taken to verify the customer's identity. For example, via the customer verification layer 214, the account management circuit 210 compares an image of the customer contained within the captured image of the customer's identification (hereafter referred to as the "identification image") to another verification image captured by the customer. As discussed above, the registration interfaces transmitted to the customer device 110 may prompt the customer to capture a verification image or video of the customer's face. In the case of a verification video, the account management circuit 210 may select a frame of the video to compare with the identification image. The selection may be based on the identification image. For example, if the identification image was captured at a particular distance and angle, the customer's face will be a particular size relative to various other aspects of the customer (e.g., shoulders). In some embodiments, the account management circuit 210 selects a frame in the verification video in which the relative size of customer's face is closest to that of the identification image. Various aspects (e.g., the relative locations of various customer facial features) of the verification image may be compared to those of the identification image and, if a sufficient correlation is found, the customer's identity may be verified.

In some embodiments, the account management circuit 210 may communicate with external entities to verify the authenticity of the customer's identification. In some embodiments, this is accomplished via a customer verification API 216. The customer verification API 216 may be configured to provide the account management circuit 210 with access to information generated or stored at a data repository 140. One such data repository 140 may be associated with the entity that issued the customer's identification. In this example, the account management circuit 210 formulates an identification validation request for transmittal to the data repository 140 over the network 150. The identification validation request may include information extracted from the captured image of the customer's identification (e.g., a customer name, address, and identification number). In response, the data repository (e.g., via the identification validation circuit 228) may retrieve information regarding the customer from a database (e.g., the customer information database 230) and compare the retrieved information to the information contained in the validation request to validate the customer's identification and notify the financial institution computing system 120.

In some embodiments, the account management circuit 210 may communicate with other external entities to verify the customer's identity. For example, via another customer verification API 216, the account management circuit 210 may formulate and transmit an identity verification request to the identity verification computing system 130. The identity verification request may include information received from the customer (e.g., a phone number, name, and address) via the registration interfaces. In response to receipt of the identity verification request, the identity verification computing system 130 (e.g., via the identity verification circuit 222 described below) may access a database (e.g., the customer information database 224) to retrieve a customer identification token generated based on information (e.g., phone number, name, and address) regarding the customer received from an external entity (e.g., a network service provider) and decode the token to reveal characteristics of the customer. The revealed characteristics may be compared to the information contained in the identification verification request to determine if the customer seeking to open up the account is associated with the customer device 110.

Still referring to FIG. 2, the identity verification computing system 130 is a computing system associated with a third party providing identity verification services to the financial institution. In the example shown, the identity verification computing system 130 includes an identity verification network circuit 220 enabling the identity verification computing system 130 to communicate data over the network 150, an identity verification circuit 222, and an identity verification customer information database 224. The identity verification customer information database 224 is configured to store information used to verify the identity of the customer. For example, the identity verification customer information database 224 may store the customer identification tokens generated based on information received from various external computing systems (e.g., from network service providers) having an association with the customer. In some embodiments, the identity verification customer information database 224 includes various blacklists of known bad actors that the financial institution is required to reference prior to creating an account for the customer (e.g., to fulfill obligations of the Customer Identification Program).

The identity verification circuit 222 is configured to formulate responses to verification requests received from the financial institution computing system 120. In this regard, the identity verification circuit 222 may be configured to identify the customer based on information contained in an identity verification request received from the financial institution computing system 120 and query the customer information database 224 for additional information regarding the customer. For example, the identity verification circuit 222 may identify a customer name based on the information contained in the identity verification request and cross-reference the customer name with the blacklist to determine if the customer is a known bad actor ineligible for an account.

In some embodiments, the identity verification circuit 222 may decode the information stored in the customer information database 224 to identify additional customer characteristics. For example, the identity verification circuit 222 may decode customer identification tokens using a private key to identify additional characteristics of the customer. The additional characteristics may then be compared to information contained in the verification request to determine if the customer is legitimately associated with the customer device 110. This way, the customer device 110 acts as an additional way of verifying the identity of the customer.

The data repository 140 is a computing system associated with an entity issuing a form of official customer identification. As such, the data repository 140 may be associated with a governmental entity (e.g., a state government or a government of a county). In the example shown, the data repository 140 includes a data repository network circuit 226 enabling the data repository to communicate data over the network 150, identification validation circuit 228, and a customer information database 230. The customer information database 230 is configured to store information used to verify the identity of the customer. For example, the customer information database 230 may store various forms of customer information (e.g., a customer name, address, phone number, etc.) in association with a customer identification number. The customer identification may be a number unique to a piece of identification issued to the customer.

The identification validation circuit 228 is configured to formulate responses to identity validation requests received from the financial institution computing system 120. In this regard, the identification validation circuit 228 may be configured to identify the customer based on information contained in a verification request received from the financial institution computing system 120 and query the customer information database 230 for additional information regarding the customer's identification. For example, the identification validation circuit 228 may identify a customer identification number contained in a verification request received from the financial institution computing system 120, retrieve additional information from the customer information database 230 stored in association with the identification number, and compare the additional information to information contained in the verification request to verify the authenticity of the customer's identification used in the account registration process.

Figure 3:
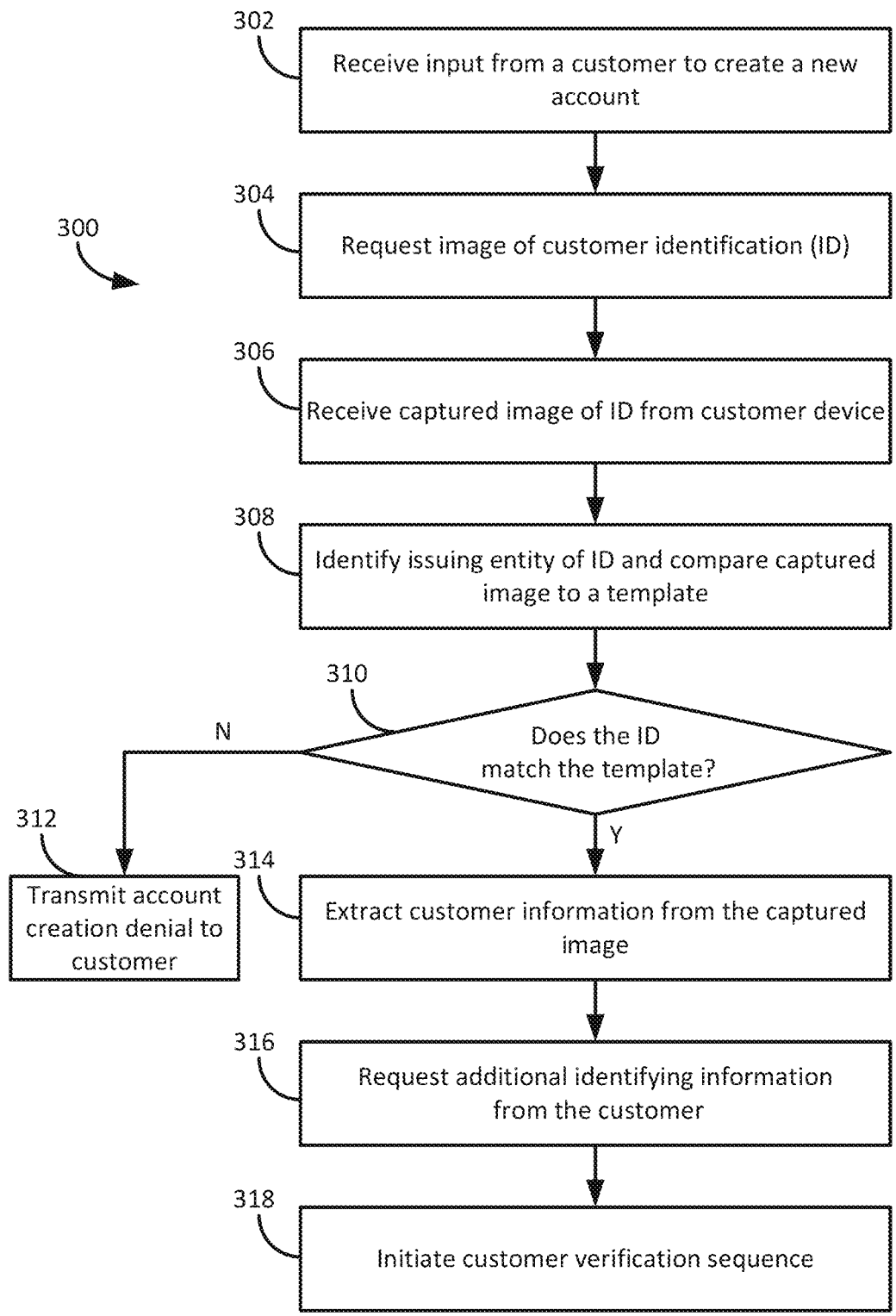
FIG. 3 is a flow chart of a method for receiving and verifying customer identification information for opening up an account, according to an example embodiment.

Referring now to FIG. 3, a flow chart of a method 300 of receiving and verifying customer identification information for opening up an account is shown according to an example embodiment. The method 300 may be performed by processing and storage hardware on the financial institution computing system 120, as executed by one or more logics comprising one or more software applications configured to perform the functions below.

At 302, a customer input to create a new account is received from a customer. For example, the customer may execute a web browser on the customer device 110 and indicate a preference (e.g., by typing in a domain name, clicking a hyperlink, etc.) to initiate network communications with the financial institution computing system 120 over the network 150. In response, communications via any known network protocol may be established, and the financial institution computing system 120 transmits content (e.g., in the form of a webpage) to the customer device 110. While accessing the webpage, the customer may view an accounts portion of the webpage. On the accounts portion, the customer may be able to provide an input to open up an account.

Alternatively or additionally, the customer may provide such an input via a separate financial institution client application 206 on the customer device 110. For example, the customer may have one type of account (e.g., a credit account) at the financial institution, and utilize the financial institution client application 206 to manage the existing account. The financial institution client application 206 may also include a portion or section that enables the customer to view various products (e.g., accounts) offered by the financial institution, and provides an input to establish a second, different type of account (e.g., a checking account).

Turning to FIG. 5A, an account opening interface 500 is shown, according to an example embodiment. In various embodiments, the account opening interface 500 may be presented to the customer when the customer navigates through the communication channel (e.g., a web browser or separate financial institution client application 206) established with the financial institution computing system 120 to view an option to establish a checking account at the financial institution. In the example shown, the account opening interface 500 includes a fees hyperlink 502, a fee avoidance hyperlink 504, an account opening button 506, and an account details hyperlink 508. The fees hyperlink 502 may cause another interface to be displayed providing details of the common fees (e.g., overdrawing fees, service fees, etc.) associated with the selected account type. The other interface may take the form of a digitized document rather than a webpage. The fee avoidance hyperlink 504 may be configured to receive a customer input to view information regarding how to avoid the fees detailed in the documentation presented in response to customer selection of the fees hyperlink. For example, the financial institution may establish a policy where customers pay no fees if certain rules are followed (e.g., keeping an account balance above a threshold). The account opening button 506 is configured to receive the customer input to open up the selected account type. The checking account details hyperlink 508 may cause another interface to be displayed providing various details as to checking accounts at the financial institution. For example, in response to selecting the account details hyperlink 508, a display screen is provided that includes an interface detailing various services provided by the financial institution to account holders (e.g., fraud detection, alerts, budgeting tools, banking applications, etc.). In some embodiments, in response to a customer selection of the account opening button 506, a notification signal is transmitted to the financial institution computing system 120. In response, the financial institution computing system 120 may transmit a set of registration interface datasets and associated program logic to the customer device over the network 510.

Turning to FIG. 5B, an additional registration interface 510 is shown according to an example embodiment. In some embodiments, the interface 510 is displayed in response to the customer providing the account-creation input at step 302 (e.g., by selecting the account opening button 506 on the interface 500). In the example shown, the interface 510 includes a status indicator button 512, a cancel button 514, and a continue button 516. The status indicator button 512 is configured to receive a customer indication as to whether the customer is already an online customer of the financial institution. If so, the accounts database 218 may include information regarding the customer that may be used to establish the customer's new account. Accordingly, if the customer provides an indication that the customer is already an online customer, the account management circuit 210 may query the accounts database 218 for information regarding the customer, and additional information gathering steps of the method 300 may be avoided. The cancel button 514 enables the customer to cancel the account creation process and another interface to be displayed. The continue button 516 is configured to receive a customer input to continue the account creation process.

In some embodiments, after receiving the customer input to create a new account (e.g., after the customer views the interfaces 500 and 510), the financial institution computing system 120 evaluates information of the customer and/or customer device 110 against predetermined criteria to select additional steps to be taken to create an account for the customer. For example, the customer input to create a new account may include customer location information (e.g., the web browser of financial institution client application 206 on the customer device 110 may interface with a GPS device) and be formatted based on the nature of the customer device 110 (e.g., an IP address assigned by a network service provider to a smartphone may vary from that assigned to a personal computer). In some embodiments, if the customer's location data meets predetermined criteria (e.g., if the customer is within a certain geographic area), and the customer device 110 is a certain type of device (e.g., a smart phone), the customer is aided through the additional steps of the method 300 described below.

Turning back to FIG. 3, at 304, an image of customer identification is requested. In some embodiments, when the customer meets any predetermined criteria discussed above and is not an existing customer of the financial institution, the financial institution computing system 120 transmits registration interface datasets and program logic to the customer device 110. Among such interface datasets may be an identification request interface that prompts the customer to capture an image of a piece customer identification. The interface datasets may be formatted such that they are viewable on the customer device via the financial institution client application 206.

FIG. 5C shows an identification request interface 518 according to an example embodiment. In the example shown, the interface 518 includes a photo capture button 520 and a cancel button 522. The photo capture button 520 is configured to receive a user input to capture a photo of a piece of customer identification such as a driver's license or passport. In response to the customer providing such an input (e.g., by pressing the photo capture button 520), the financial institution client application 206 causes a processor of the customer device 110 to activate a camera on the customer device 110. Additionally, the customer is presented with an interface that shows the view of the camera and includes additional instructions for capturing the image (e.g., the interface may include an outline shape of a piece of identification and prompt the customer to line the piece of identification up within the outline prior to capturing an image). When the customer lines the piece of identification up within the viewing angle of the camera, the camera automatically captures an image of the customer identification. The customer device 110 then transmits the captured image over the network 150 to the financial institution computing system 120, where the image is received at 306. In some embodiments, multiple images of the customer's identification are requested (e.g., of both the front and the back of the customer's identification). In some embodiments, a video of the customer identification is captured.

At 308, based on the image of the customer identification captured by the customer, the financial institution computing system 120 identifies an issuing entity for the customer identification. For example, the customer verification layer 214 of the account management circuit 210 may include a set of issuing entity names (e.g., departments of governments) for various forms of customer identifications, and the account management circuit 210 may process the image captured by the customer to identify which of the entities is included in the captured image. Having identified the issuing entity, the account management circuit 210 may retrieve an identification template stored in association with identified entity. The identification templates may be stored in the memory of the financial institution computing system 120 or remotely from the financial institution computing system 120 (e.g., at a data repository 140 or an identity verification computing system 130). The captured image is then compared with the retrieved template.

At 310, it is determined if the customer identification matches the template. For example, the template may include information describing various signatures contained on identification issued by the identified issuing entity. As discussed above, the signatures may include specifically placed elements (e.g., logos, marking, coloring schemes, etc.) on pieces of identification issued by the identified entity. Accordingly, the account management circuit 210 of the financial institution computing system 120 may analyze the image for the occurrence of the signatures and compare the signatures to those included on the template. If a signature is found to be misplaced or different from that on the template, it is an indication that the customer or someone posing as the customer is using a fraudulent piece of identification. As such, if a mismatch is found, the financial institution computing system 120 transmits an account creation denial notification to the customer device 110 at 312. The denial notification may be an interface presented to the customer indicating that the customer's request to create an account is denied due to the identification mismatch. Alternatively, the notification may request the customer to capture an additional mage of the identification, and another comparison to the template may be made.

At 314, if all of the signatures present in the template are properly located on the customer's identification, customer information is extracted from the captured image of the identification. For example, a customer identification number, date of birth, and address may be extracted from the captured image via optical character recognition. Such data fields may be used to generate a customer profile to create the requested account.

At 316, additional information is requested from the customer 316. For example, while the financial institution computing system 120 is processing the image of the customer's identification, the customer device 110 (e.g., via the program logic and registration interface datasets transmitted to the customer device after the initial input was received at 302) may present an information gathering interface to the customer. Alternatively, such an interface may be transmitted to the customer device 110 by the financial institution computing system 120 upon the financial institution computing system 120 determining that the customer captured an image of a valid piece of identification. Such an interface may request various forms of information from the customer that are not commonly found on pieces of official identification.

FIG. 5D shows an example information gathering interface 524. In the example shown, the interface 524 includes an information requesting window 526 and a cancel button 528. The information gathering window 526 includes various fields requesting various forms of information from the customer. For example, the information gathering window may request a customer e-mail (e.g., for the purposes of alerting the customer to account activity), a customer phone number, a customer phone type (e.g., via a dropdown menu enabling the customer to select from a number of different phone types such as mobile, home, or office), social security number, and occupation (e.g., for the purpose of verifying the customer's identity). The cancellation button 528 enables the customer to provide an input to end the method 300.

Referring back to FIG. 3, at 318, a customer identity verification sequence is initiated upon receipt of the additional customer information from the customer device 110. For example, the financial institution computing system 120 may transmit additional interface datasets and program logic to the customer device 110 requesting the customer to provide a verification image for comparison with the captured image of the customer's identification discussed above. Additionally, the financial institution computing system 120 may communicate with external computing systems (e.g., an identity verification computing system 130 and/or data repository 140 to verify the accuracy of the information received from the customer during the method 300).

In some embodiments, the identity verification sequence takes the form of the method 400 described below in relation to FIG. 4. In some embodiments, the identity verification sequence is initiated upon completion of the method 300. In some embodiments, various steps of the identity verification sequence may be performed between or at the same time as the steps of the method 300 discussed above.

In some embodiments, prior to or as the identity verification sequence is being performed by the financial institution computing system 120, the customer may be asked to provide additional information to the financial institution. For example, additional interface datasets may be transmitted to the customer device 110 that instruct the customer to provide information regarding a funding source for an initial deposit on the customer's new account. FIG. 5E shows an example funding source interface 530 according to an example embodiment. In some embodiments, the funding source interface 530 may be presented to the customer prior to the financial institution computing system 120 completing the identity verification sequence described below. In some embodiments, the funding source interface 530 may be presented to the customer after the identity verification sequence.

In the example shown, the funding source interface 530 includes a first funding source option 532, a second funding source option 534, a third funding source option 536, and a cancel button 538. Funding source options 532-534 are configured to receive a customer input to provide an initial deposit to fund the new account with a specific type of payment vehicle. Upon selection of any of the options 532-534, an additional interface is displayed enabling the customer to input information regarding the selected vehicle (e.g., an account number, expiration data, other authentication information such as a CVV number). The information regarding the payment vehicle may be input manually by the customer or the customer may take an image of the payment vehicle (e.g., a check, a credit card, or a debit card) via methods similar to those discussed herein in relation to the image of the customer's identification. The cancel button 538 enables the customer to cancel the account creation process 538. In some embodiments, the financial institution computing system 120 erases all information obtained from the customer in response to the customer selecting the cancel button 538 (or any of the other cancel buttons described herein).

Upon receipt of the customer funding information, the financial institution computing system 120 formulates a transaction request and initiate communications over the network 150 with another financial institution computing system associated with the payment vehicle identified by the customer to approve a transfer into the customer's new account. For example, if the customer input checking account information into the funding source interface 530, the financial institution computing system 120 may formulate a transaction request and transmit the transaction request to another financial institution associated with the checking account. The other financial institution may approve the request, and transfer funds from the checking account to the financial institution associated with the financial institution computing system 120 to fund the new account.

Additionally, during or after the financial institution computing system 120 performs the identity verification sequence described below, the financial institution computing system 120 may also request that the customer verify the information received from the customer via the method 300. FIG. 5F shows an example information verification interface 540. In the example shown, the verification interface 540 includes a customer information window 542 and an amendment button 544. The customer information window 542 contains various fields for various items of information gathered from the customer via the method 300. In the example shown, the information includes only information extracted from the captured image of the customer's identification such as a customer name, a type of customer identification, an issuing entity of the identification, an expiration, a date of birth, and a customer address. In some embodiments, the information window 542 also includes additional information gathered directly from the customer (e.g., via the information gathering interface 524 discussed above). The amendment button 544 enables the customer to amend the information to be used to create the new account. For example, a customer's preferred address may vary from the address extracted from the captured image of the customer's identification, and the customer may amend the address to a more preferred address. In some embodiments, the financial institution computing system 120 utilizes updated information entered by the customer after pressing the amendment button 544 to perform the customer verification sequence described below.

Figure 4:
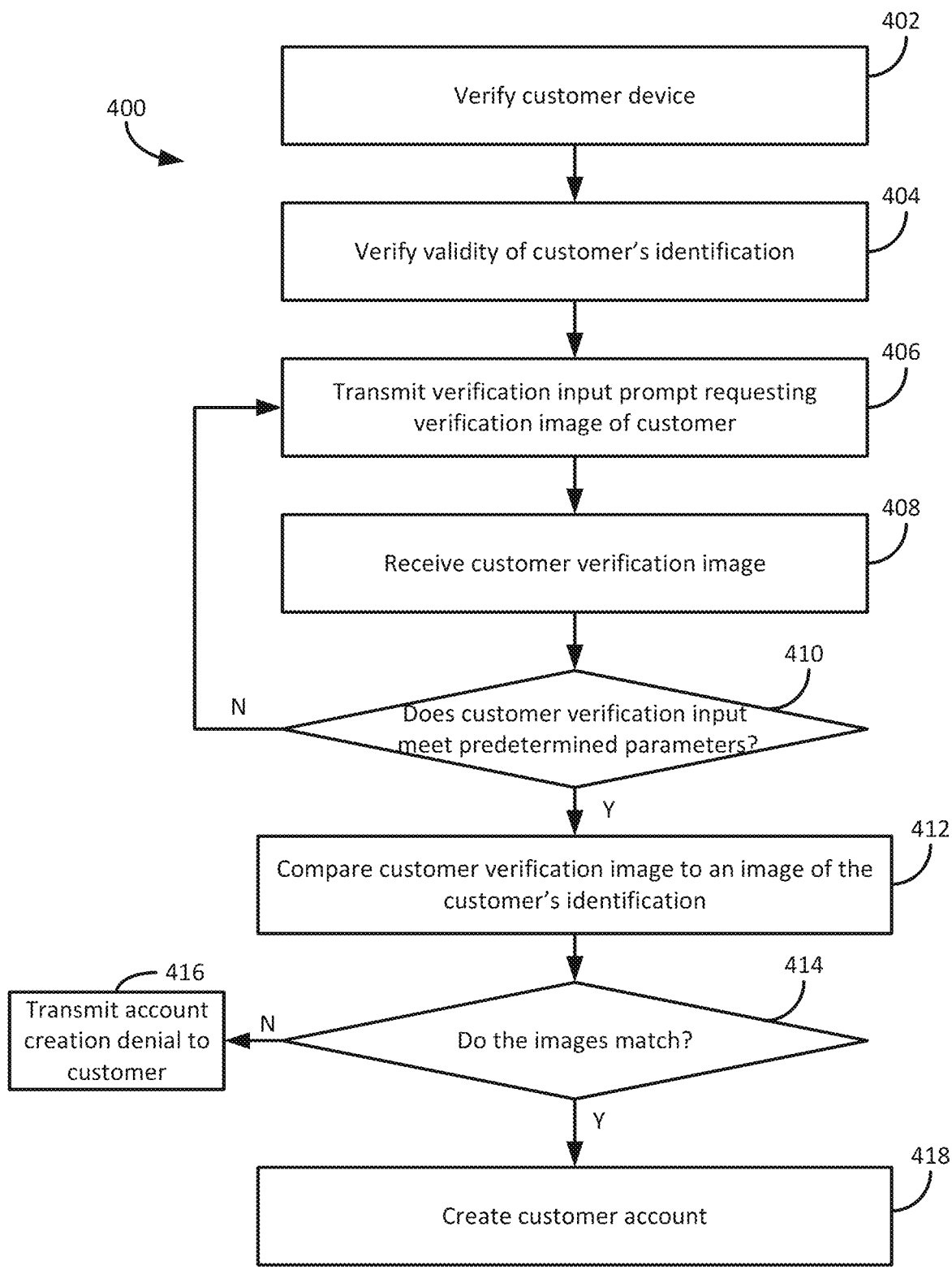
FIG. 4 is a flow chart of a method for verifying a customer's identity for opening up an account, according to an example embodiment.

Referring now to FIG. 4, a flowchart of a method 400 of a method of verifying a customer's identity for the purposes of creating an account for the customer is shown, according to an example embodiment. The method 400 may be performed by processing and storage hardware at a financial institution computing system 120 associated with a financial institution, as executed by one or more logics comprising one or more software applications configured to perform the functions described below. In some arrangements, the method 400 is initiated after a customer input to establish a new account is received by the financial institution computing system 120 and the financial institution collects information from the customer (e.g., via the method 300 discussed above).

At 402, the customer device 110 is verified. In some embodiments, the identity of the customer may be verified based on the customer device 110 on which the customer input the information collected by the financial institution to establish a new account for the customer. In this regard, the financial institution computing system 120 may formulate an identity verification request based on the communications with the customer during the method 300. As discussed above, while registering for a new account, the customer may provide information regarding the customer device 110 (e.g., a phone number) to the financial institution computing system 120. Alternatively, such information may be obtained automatically over the course of network communications with the customer device 110 (e.g., communications transmitted by the customer device 110 over the network 150 may include an IP address). The financial institution computing system 120 may package this information regarding the customer device 110 with other information obtained from the customer (e.g., a customer name and address) into the identity verification request and transmit the identity verification request to an identity verification computing system 130.

As discussed above, the identity verification computing system 130 may maintain a database (e.g., the customer information database 224) that includes a plurality of customer identification tokens generated based on the customer device 110 and other customer information. Accordingly, responsive to receiving an identity verification request from the financial institution computing system 120, the identity verification computing system 130 retrieves a customer identification token associated with the customer, and compares the customer information encoded in the token to the information contained in the verification request. If the tokenized customer information matches the customer information contained in the identity verification request, the identity verification computing system 130 may transmit a verification to the financial institution computing system 120 and the method 400 continues.

At 404, the validity of the customer's identification is further verified. In some embodiments, in addition to comparing the customer's identification to an identification template, the financial institution computing system 120 also verifies the customer information contained on the customer's identification. To do this, the financial institution computing system 120 may package the information extracted from an image of the customer's identification (e.g., received at step 306 of the method 300 discussed above) into an identity validation request, and transmit the validation request to a data repository 140. In response, the data repository 140 retrieves information regarding the customer stored in the customer information database 230 and compares the retrieved customer information to the information contained in the validation request. If the retrieved information matches the customer information contained in the validation request, the data repository 140 may transmit a validity notification to the financial institution computing system 120.

At 406, a verification input prompt is transmitted to the customer device 110. In some embodiments, having verified the customer device 110 and the validity of the customer's identification, the financial institution computing system 120 seeks further assurance that the customer is actually the person requesting the creation of the account. In this regard, the financial institution computing system 120 may transmit additional verification interface datasets and program logic to the customer device 110. Such interface datasets may present the user with verification interfaces that request the information to input additional information used to verify the customer. One such interface prompts the customer to answer a security question. The security question asks the customer about knowledge that typically only the customer would have on hand (e.g., a mother's maiden name, a child pet's name, a favorite teacher, etc.). The financial institution computing system 120 may receive such information from an external computing system (e.g., an identity verification computing system 130) and compare any answers provided by the customer to the received answers to further verify the customer's identity.

Alternatively or additionally, the verification interface prompts the customer to capture an image or video of the customer's face while the customer performs a predetermined action. This way, the account management circuit 210 verifies that an image of the customer stored on the customer device 110 is not being sent to the financial institution computing system 120. The predetermined action may be any pose, gesture, or movement pattern that is perceivable in an image. For example, in one embodiment, the verification interface prompts the customer to capture a video of the customer's face while the customer blinks in a pattern (e.g., three times in consecutive seconds). As such, the verification interface may bear some resemblance to the identification request interface 518 discussed above with respect to FIG. 5C. In response to the customer capturing the requested image or video, the customer device 110 may transmit the images or video to the financial institution computing system 120.

At 408, the customer verification inputs are received. For example, the financial institution computing system 120 receives customer answers to a security question and/or verification images over the network 150 via the network circuit 208. Next, at 410, the financial institution computing system 120 determines if the received customer verification inputs meets predetermined parameters. In some embodiments, this includes determining if any customer answers to any security questions matches the information received by the financial institution computing system 120 from external computing systems (e.g., an identity verification computing system 130).

Alternatively or additionally, the financial institution computing system 120 may determine if the verification image or video captured by the customer includes the customer performing the predetermined action that the verification interfaces instructed the customer to perform while capturing the verification images. For example, if the predetermined action is a customer blinking pattern, the financial institution computing system 120 may analyze successive frames of a verification video to determine if pixel colorations in similar positions changes to a flesh color (indicating a blinking action of the customer). In another example, the financial institution computing system 120 analyzes the relative positioning of flesh-colored batches of pixels in the received verification image (e.g., to determine the positioning of the customer's hands relative to the customer's face) to determine if the customer made a predetermined gesture. In some embodiments, if the account management circuit 210 determines that the verification image does not meet predetermined parameters (e.g., that the customer did not perform the predetermined action while capturing the verification image), the method 400 reverts back to 406 and the customer is requested to re-capture the verification image.

At 412, the customer verification image or video (or a portion thereof) is compared to the previously received image of the customer's identification. In various embodiments, the image of the customer's identification includes an image of the face of the customer. Accordingly, this portion of the customer's identification image is compared to the portion of the customer's verification image that contains the customer's face to further verify the customer.

At 414, it is determined if the customer's verification image matches the customer's identification image. For example, the relative positioning of various customer facial features (e.g., the relative positioning of the tip of the customer's chin to the bottom of the customer nose) in each image may be compared with one another to determine if the images contain the same face. If these relative distances are determined to not be within predetermined thresholds of one another, the financial institution computing system 120 may transmit an account creation denial to the customer device 110 at 416. As such, the customer will not have access to a newly created account.

At 418, if the customer verification image matches the customer's identification image, the financial institution computing system 120 creates a new account for the customer. In some embodiments the account management circuit 210 generates a new account number for the customer. The account management circuit 210 may create an entry in the accounts database 218 for the account number and store the information received from the customer during the account creation process (e.g., during the method 300 discussed above) in association with the customer account number. Additionally, the account management circuit 210 may transfer funds from an initial funding source indicated by the customer during the registration process (e.g., input by the customer into funding source interface 530 discussed in relation to FIG. 5E).

Turning now to FIG. 5G, an account creation interface 546 is shown, according to an example embodiment. In some embodiments, the account creation interface 546 is presented to the customer after the financial institution computing system 120 verifies the identity of the customer (e.g., via performance of the method 400 discussed above). In some embodiments, the account creation interface 546 is presented to the customer prior to the performance of the method 400. For example, in one embodiment, the financial institution computing system 120 creates an account for the customer prior to completing the method 400, and only enables the customer to access the account after completion of the method 400.

In the example shown, the account creation interface 546 includes an account information window 548 and an online banking enrollment button 550. The account information window 548 provides information to the customer regarding the newly created checking account. In the example shown, the account information window 548 only includes the account number. In some embodiments, the account information 548 includes additional information. For example, the account information window 548 may inform the customer regarding services provided by the financial institution relating to the account (e.g., fraud monitoring, alerts, budgeting tools). Additionally, the account information window 548 may inform the customer regarding a mobile banking application provided by the financial institution that enables the customer to manage the newly created account. The online banking enrollment button 550 enables the customer to register for online banking, which provides the customer access to a web interface or separate application provided by the financial institution to perform various management functions (e.g., check balances, transfer funds, pay bills) with respect to the newly created account.

Turning now to FIG. 5H, an online banking enrollment interface 552 is shown, according to an example embodiment. In some embodiments, the online banking enrollment interface 552 is presented in response to the customer selecting the online banking enrollment button 550 on the account creation interface 546. In the example shown, the online banking enrollment interface 552 includes a credential window 554 and an enrollment button 556. The credential window 554 includes various fields enabling the customer to establish login credentials to access the new account. For example, the credential window 554 enables the customer to establish a username, a password, and a language preference with respect to an online banking account generated basically at the same time as the customer's new checking account. In some embodiments, the credential window 554 enables the customer to establish additional credentials to access online banking. For example, the credential window may enable the customer to establish biometric credentials (e.g., fingerprint recognition, facial recognition, or voice recognition). Alternatively or additionally, the credential window 554 may enable the customer to establish a numerical PIN to access the online banking account. Additionally, the credential window 554 may enable the customer to answer a security question that must be answered for the online banking account to be accessed. The enrollment button 556 enables the customer-input credentials to be transmitted to the financial institution computing system 120 over the network 150 and stored in the accounts database 218 in association with the newly-created customer account.

Thus, through the customer verification and account creation systems and methods disclosed herein, a customer previously unaffiliated with the financial institution is able to seamlessly open and set up a checking account and an online banking account with the financial institution in a matter of minutes, while the financial institution fulfills regulatory customer due diligence requirements. As such, the systems and methods disclosed herein improve account creation processes for both the financial institution and customers.

The embodiments described herein have been described with reference to drawings. The drawings illustrate certain details of specific embodiments that implement the systems, methods, and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network circuits, peripheral devices, input devices, output devices, and sensors. In some embodiments, a circuit may take the form of one or more analog circuits, electronic circuits (e.g., integrated circuits (IC), discrete circuits, system on a chip (SOCs) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the embodiments might include general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input device," as described herein, may include any type of input device or input devices including, but not limited to, a keyboard, a keypad, a mouse, joystick, or other input devices capable of performing a similar function. Comparatively, the term "output device," as described herein, may include any type of output device or output devices including, but not limited to, a computer monitor, printer, facsimile machine, or other output devices capable of performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps, and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described to explain the principals of the disclosure and its practical application to enable one skilled in the art to utilize the various embodiments and with various modifications as are suited to the particular use contemplated. Other substitutions, modifications, changes, and omissions may be made in the design, operating conditions, and arrangement of the embodiments without departing from the scope of the present disclosure as expressed in the appended claims.

What is claimed is:

1. A computing system comprising:
    a network interface configured to communicate data over a network with a user device;
    an accounts database configured to store information regarding a plurality of customer accounts associated with a plurality of customers of a provider institution; and
    an account management circuit communicably coupled to the network interface and the accounts database, the account management circuit comprising one or more processors communicably coupled to one or more memory devices, the one or more memory devices storing instructions that, when executed by the one or more processors, cause the one or more processors to:
        prompt a user, via a user interface displayed on the user device, to capture a first image of an identification item of the user;
        generate, responsive to receiving an input from the user device via the user interface regarding establishment of a new account, an interface overlay on the user interface, the interface overlay comprising an outline for the identification item;
        determine that the identification item is contained within the outline of the interface overlay;
        actuate, automatically based on the determination that the identification item is contained within the outline, a camera of the user device to capture the first image of the identification item of the user;
        prompt the user, via the user interface, to capture a second image of the user using the user device;
        identify an issuing entity of the identification item based on the first image;
        retrieve, from a first data repository associated with the issuing entity, an identification template associated with the issuing entity;
        compare a template signature of the identification template with an identification item signature of the identification item from the first image;
        verify an authenticity of the identification item based on the identification item signature matching the template signature;
        extract, via an image extraction logic responsive to verifying the authenticity of the identification item, user information from the first image of the verified identification item;
        transmit a validation request to a second data repository, the validation request comprising the user information;
        receive, from the second data repository, a validity notification verifying the user information;
        verify an identity of the user based on a comparison of the first image with the second image of the user; and
        create, responsive to the verification of the identity of the user and the user information and the authenticity of the identification item, the new account for the user.

2. The computing system of claim 1, wherein the instructions further cause the one or more processors to:
    prompt the user, via the user interface, to capture a third image of a payment vehicle associated with a payment account of the user;
    extract, via the image extraction logic, information regarding the payment vehicle from the third image; and
    create, responsive to the verification of the identity of the user and the user information, the new account, wherein creating the new account is based on the extracted user information and the extracted information regarding the payment vehicle.

3. The computing system of claim 2, wherein the user device is a mobile device, and wherein the account management circuit is further configured to verify the identity of the user based on:
    receipt of a verification message from the issuing entity that issued the identification item; and
    receipt of a mobile device verification message from a third party external service provider identity verification computing system associated with a third party external service provider, wherein the third party external service provider is a provider of a cellular service on the mobile device, and wherein the mobile device verification message indicates that the user is an authorized user of the user device.

4. The computing system of claim 3, wherein the instructions further cause the one or more processors to:
    identify, based on the user information extracted from the first image, additional information to be obtained from the user to establish the new account;
    provide a registration prompt to the user via the user device instructing the user to input the additional information; and
    receive, over the network via the network interface, the additional information from the user device.

5. The computing system of claim 4, wherein the identification item comprises a driver's license, and wherein the issuing entity of the driver's license comprises a government entity.

6. The computing system of claim 5, wherein the instructions further cause the one or more processors to:
    transmit, over the network via the network interface, an information request to the first data repository associated with the government entity, the information request requesting at least a portion of the extracted user information;

receive, over the network via the network interface, a portion of the requested information from the first data repository; and verify an authenticity of the driver's license by comparing the extracted user information to the information received from the first data repository, wherein the additional information is requested from the user responsive to the verification of the authenticity of the driver's license.

7. The computing system of claim 4, wherein the additional information includes a user phone number associated with the user device, and wherein the instructions further cause the one or more processors to:

transmit, by the network interface over the network, a mobile device verification request to the third party external service provider identity verification computing system including the user phone number.

8. The computing system of claim 1, wherein the instructions further cause the one or more processors to cause the user device to navigate to a webpage in response to receiving the input regarding establishing the new account, the webpage configured to facilitate the capture of the first image and the second image.

9. The computing system of claim 8, wherein the second image comprises a video captured by the user, wherein the webpage is configured to instruct the user to perform an action while capturing the video, and wherein verifying the identity of the user includes determining, by comparing successive frames of the video, that the user performed the action.

10. The computing system of claim 9, wherein the action comprises at least one of blinking, smiling, opening a user's mouth, or turning a user's head, and wherein the action is part of a movement pattern.

11. The computing system of claim 1, wherein the new account comprises at least one of a savings account, a checking account, or a line of credit.

12. The computing system of claim 1, wherein the second image comprises a video captured by the user, and wherein verifying the identity of the user further includes selecting a frame of the video to compare with the first image.

13. A computer-implemented method comprising:

receiving, by a computing system, an input from a user device associated with a user to establish a new account;

prompting, via a user interface displayed on the user device, the user to capture an image of an identification item of the user;

generating, by the computing system, responsive to receiving the input from the user device via the user interface, an interface overlay on a webpage displayed on the user device, the interface overlay comprising an outline for the identification item;

determining, by the computing system, that the identification item is contained within the outline of the interface overlay;

actuating automatically, by the computing system based on the determination that the identification item is contained within the outline, a camera of the user device to capture the image of the identification item;

prompting the user, via the user interface, to capture an identity verification image of the user using the user device;

identifying, by the computing system, an issuing entity of the identification item based on the image of the identification item;

retrieving, by the computing system from a first data repository associated with the issuing entity, an identification template associated with the issuing entity;

comparing, by the computing system, a template signature of the identification template with an identification item signature of the identification item from the image of the identification item;

verifying, by the computing system, an authenticity of the identification item based on the identification item signature matching the template signature;

extracting, by the computing system via image extraction logic responsive to verifying the authenticity of the identification item, user information from the image of the verified identification item;

transmitting, by the computing system, a validation request to a second data repository, the validation request comprising the user information;

receiving, from the second data repository, a validity notification verifying the user information;

verifying, by the computing system, an identity of the user based on comparing the image of the verified identification item with the identity verification image; and creating, responsive to verifying the identity of the user and the user information and authenticating the identification item, by the computing system, the new account for the user.

14. The method of claim 13, further comprising:

identifying, by the computing system, based on the user information extracted from the image of the verified identification item, additional information to obtain from the user to create the new account;

transmitting, by the computing system, a registration prompt to the user device, the registration prompt instructing the user to input the additional information; and receiving, by the computing system, the additional information from the user device.

15. The method of claim 14, wherein the identification item comprises a driver's license, wherein the issuing entity of the driver's license comprises a government entity.

16. The method of claim 15, further comprising:

transmitting, by the computing system, an information request to the first data repository associated with the government entity, the information request requesting at least a portion of the user information extracted from the image of the identification item from the first data repository;

receiving, by the computing system, a portion of the requested information from the first data repository; and verifying, by the computing system, an authenticity of the driver's license by comparing the user information extracted from the image of the identification item to the portion of the requested information received from the first data repository, wherein the additional information is requested from the user responsive to the verification of the authenticity of the driver's license.

17. The method of claim 14, wherein the user device is a mobile device, wherein the additional information includes a user phone number associated with the user device, the method further comprising:

transmitting, by the computing system, a mobile device verification request to a third party external service provider identity verification computing system including the user phone number.

18. A non-transitory computer readable media having computer-executable instructions stored on one or more memory devices, the instructions embodied therein that, when executed by one or more processors of an account management circuit of a computing system, causes the computing system to perform operations to generate a new account for a user, the operations including:
- receiving an input from a user device associated with the user to establish the new account, wherein the user device is a mobile device;
- prompting the user via a user interface of the user device to capture an image of an identification item of the user;
- generating an interface overlay on a webpage displayed on the user device, the interface overlay comprising an outline for the identification item;
- determining that the identification item is contained within the outline of the interface overlay;
- actuating automatically, based on the determination that the identification item is contained within the outline, a camera of the user device to capture the image of the identification item;
- prompting the user to capture an identity verification image of the user using the user device;
- identifying an issuing entity of the identification item based on the image of the identification item;
- retrieving, from a first data repository associated with the issuing entity, an identification template associated with the issuing entity;
- comparing a template signature of the identification template with an identification item signature of the identification item from the image of the identification item;
- verifying an authenticity of the identification item based on the identification item signature matching the template signature;
- extracting, responsive to verifying the authenticity of the identification item, user information from the image of the verified identification item;
- transmitting a validation request to a second data repository, the validation request comprising the user information;
- receiving, from the second data repository, a validity notification verifying the user information;
- verifying an identity of the user based on comparing the image of the verified identification item with the identity verification image; and
- creating, responsive to verifying the identity of the user and the user information and authenticating the identification item, the new account for the user.

19. The computing system of claim 1, wherein the template signature includes a signature associated with an authentic identification item issued by the issuing entity, wherein the account management circuit is configured to determine whether the signature associated with the authentic identification item is present in the first image of the identification item to verify the authenticity of the identification item.

* * * * *